United States Patent
Shah et al.

(10) Patent No.: US 7,111,105 B2
(45) Date of Patent: Sep. 19, 2006

(54) SYSTEM TO OPTIMALLY ORDER CYCLES ORIGINATING FROM A SINGLE PHYSICAL LINK

(75) Inventors: Paras Shah, Houston, TX (US); Ryan J. Hensley, Dallas, TX (US); Jaideep Dastidar, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 526 days.

(21) Appl. No.: 10/038,844

(22) Filed: Dec. 31, 2001

(65) Prior Publication Data

US 2003/0126342 A1    Jul. 3, 2003

(51) Int. Cl.
G06F 13/36    (2006.01)

(52) U.S. Cl. ............... 710/312; 710/313; 710/310; 710/29

(58) Field of Classification Search ........... 710/100, 710/112, 305, 306, 311, 310, 312, 313, 29
See application file for complete search history.

(56) References Cited

U.S. PATENT DOCUMENTS

| | | | | |
|---|---|---|---|---|
| 5,381,528 | A * | 1/1995 | Brunelle | 710/56 |
| 5,594,878 | A * | 1/1997 | Shibata et al. | 710/311 |
| 5,717,876 | A * | 2/1998 | Robertson | 710/309 |
| 5,894,587 | A * | 4/1999 | Normoyle et al. | 710/310 |
| 5,915,104 | A * | 6/1999 | Miller | 710/310 |
| 6,076,130 | A * | 6/2000 | Sharma | 710/310 |
| 6,119,191 | A * | 9/2000 | Neal et al. | 710/311 |
| 6,138,192 | A * | 10/2000 | Hausauer | 710/100 |
| 6,205,506 | B1 * | 3/2001 | Richardson | 710/310 |
| 6,219,737 | B1 * | 4/2001 | Chen et al. | 710/310 |
| 6,233,641 | B1 * | 5/2001 | Graham et al. | 710/316 |
| 6,301,630 | B1 * | 10/2001 | Chen et al. | 710/310 |
| 6,615,295 | B1 * | 9/2003 | Shah | 710/54 |
| 6,694,397 | B1 * | 2/2004 | Lackey et al. | 710/112 |

OTHER PUBLICATIONS

Jones, O.M., Lucenti, M.J., Jr., "Flexible Collaborative Support: an architecture and application", Oct. 2000, System, Man and Cybernetics, 2000 IEEE International Conference.*
PCI Special Interest Group, "PCI-to-PCI Bridge Architecture Specification", 1998, Rev. 1.1, pp. 11-13, 19-30.*
PCI Special Interest Group, "PCI-X Addendum to the PCI Local Bus Specification", 1999, Rev. 1.0, p. 39.*

* cited by examiner

Primary Examiner—Mark H. Rinehart
Assistant Examiner—Justin King

(57) ABSTRACT

A method and architecture optimizes transaction ordering in a hierarchical bridge environment. A parent-bridge is one level above a child-bridge, which in turn is one level above a grand-child component. The parent-bridge is a bridge-bridge. The child-bridge can be a bus-bridge or a bridge-bridge. The grand-child component can be a bus, a bus-bridge or a bridge-bridge. A parent-bridge is connected to a child-bridge via child-links, the child-bridge connected to grandchild-links, and the parent-bridge having multiple transaction order queues (TOQs) per child-link. Ideally, the parent-bridge has one TOQ for each grandchild-link where the parent-bridge applies separate transaction ordering for each of the grandchild-links. However, at a minimum, the system uses at least two TOQs per child-link, and as such, provides a higher level of transaction throughput than systems using one TOQ per child-link. The child-bridge sends a signal to the parent-bridge identifying from which grandchild-link a transaction was sent.

36 Claims, 5 Drawing Sheets

SYSTEM TO OPTIMALLY ORDER CYCLES ORIGINATING FROM A SINGLE PHYSICAL LINK

BACKGROUND OF THE INVENTION

1. Field of the Invention

The invention relates to ordering cycles originating from multiple subordinate devices.

2. Description of the Related Art

Modern computer systems generally include input/output (I/O) devices that are connected to a central processing unit (CPU) via a system bus. The system bus operates to transfer addresses, data and control signals between the CPU and the I/O devices. Many modern computer systems include multiple buses, each in turn, with multiple I/O devices. Typically, any particular I/O device is coupled to only a single bus.

Bus bridges(bus-bridges) are often used in these multiple-bus systems to connect the multiple I/O devices connected to the multiple buses. "Bridge brides"(bridge-brides) are also often used in such systems to connect bus-bridges and thus handle communications from an even greater number of I/O devices. The commands transferred through both of these types of bridges frequently have data associated with them (e.g., read or write commands). The rate at which this multi-bridge architecture can process the communications generated from its multiple I/O devices directly affects the overall system performance. There is a constant demand for increasing the performance of modern computer systems generally. One way to achieve greater performance is to increase the rate at which communications from the I/O devices are processed.

As shown in FIG. 1, multi-bridge architectures can be viewed as having several different levels. A level 0 containing buses 122 and 124 and devices 112A–112F, which may be collectively referenced as 112, a level 1 containing bus-bridges 139 and a level 2 including bridge-bridges 149. Level 0 includes I/O devices 112 connected to buses 122 and 124. At level 1, bus-bridge 139 is connected to the buses 122 and 124 of level 0. Further, the bus-bridge 139 has a transaction order queues (TOQ) 131 and transaction buffers 186 for each bus-bridge/bus link, such as bus-bridge/bus link 162. TOQ 131 stores transaction buffer identifiers for certain transactions to ensure that system ordering rules, such as PCI and PCI-X ordering rules, are not violated. The purpose of the TOQ 131 is to ensure that transactions will execute in an order consistent with the system ordering rules. As such, not all transactions go into the TOQ, only those for which ordering rules apply. In contrast, transaction buffers store transaction information, such as cycle address, command, data, and the like. Next, level 2 contains one or more bridge-bridges, which may be represented by bridge-bridge 149. Bridge-bridge 149 is connected to one or more bus-bridges, such as bus-bridge 139 from level 1. Each bridge-bridge/bus-bridge link, such as bridge-bridge/bus-bridge link 152 between bridge-bridge 149 and bus-bridge 152, has one representative TOQ, which is TOQ 142, and one transaction buffer, such as transactional buffer 180, in the corresponding bridge-bridge 149. An inherent difference between bus-bridge 139 and bridge-bridge 149 is that bus-bridge 139 connect a series of buses 122 and 124, while bridge-bridge 149 connect a series of bridges. The bus-bridge's 139 direct link to buses 122 and 124 assures that bus-bridge 139 always know from which one of the buses 122 and 124 a transaction originated. Bridge-bridge 149, in contrast, does not have a separate link for each of the buses 122 and 124, and as such, are not inherently able to identify the bus source of any transaction. This inability to identify the bus source negatively impacts the ability for ordering transactions at the bridge-bridge level, and as such, also unnecessarily limits the corresponding transactional throughput of the entire system.

Transaction ordering, as discussed in more detail in the two U.S. patent applications incorporated below: U.S. patent application Ser. No. 09/749,111 by Paras Shah, "Relaxed Read Completion Ordering in a System Using a Transaction Order Queue," filed Dec. 26, 2000, and issued into U.S. Pat. No. 6,615,295 on Sep. 2, 2003, and U.S. patent application Ser. No. 09/779,424, entitled "Enhancement to Transaction Order Queue," filed Feb. 8, 2001, orders a set of transactions based on a predefined set of rules. These rules are designed to achieve optimum transaction ordering where a single TOQ receives transactions originating from a single bus. However, where a TOQ receives transactions originating from multiple buses, optimum transaction ordering is lost and the overall transaction throughput is reduced. In further detail, and as shown in FIG. 1, TOQs 142 and 131, are used in two different types of bridges in two different levels. The first bridge, in level 2, is a bridge-bridge 149, where single TOQs 142 are used per each bridge-bridge/bus-bridge link (child-link) 152, regardless of the number of buses 122 and 124 attached to the corresponding bus-bridge 139. The second bridge, at level 1, is a bus-bridge 139 where single TOQs 131 are used for each bus-bridge/bus link (grandchild-link) 160. In the case of a bus-bridge 139, where there exists a one-to-one ratio between TOQs 131 and 132 and buses 122 and 124, a TOQ 131, as designed, is limited to ordering the transactions from a single bus, and as such, is able to perform at its top design efficiency. However, in the case of a bridge-bridge 149, where there exists a one-to-many ratio between TOQs 142 to buses 122 and 124, a TOQ 142 is required to process transactions from multiple busses 122 and 124 over a single child-link 152. Specifically, TOQ 142 for example, is required to process transactions from multiple buses 122 and 124, and treat every transaction received through child-link 152, whether from bus 122 or bus 124, as though it originated from a single bus, and as such, the TOQ 142 is unable to function at its intended efficiency. In other words, because the bridge-bridge 149 is unable to discern between transactions of different buses 122 and 124 connected to a bus-bridge 139, the bridge-bridge 149 must order such transactions as though they occurred on the same bus, bus 122 for example. Because of this, unnecessary blocking occurs where a blocking condition on one bus, bus 122 for example, is imposed, across the entire child-link, child-link 152 for example, effecting every attached bus 122 and 124, and unnecessarily reduces transaction throughput.

SUMMARY OF THE INVENTION

Briefly, the illustrative system comprises a method and architecture for optimizing transaction ordering operations in a hierarchical bridge environment. The architecture includes at least a first bridge (parent-bridge), connected to a second bridge (child-bridge) via a link (child-link), and the child-bridge is connected to a transaction link (grandchild-link), where a parent-bridge has a set of buffers for each child-link to hold incoming transactions. For each child-link, the parent-bridge has at least two TOQs to provide separate transaction ordering for the child-links that communicate transactions from multiple different transaction sources, i.e., multiple grandchild-links.

In the illustrative system's most efficient operation, for every grandchild-link from the child-bridge, the parent-bridge maintains a dedicated TOQ. In providing a TOQ for each grandchild-link the parent-bridge is able to apply transaction order rules across the transactions from the individual grandchild-links in essentially the same manner as if the individual grandchild-links were each separately directly connected to the parent-bridge (i.e., child-links). This design essentially allows a parent-bridge to handle the transaction ordering of additional grandchild-links, without the need to connect such grandchild-links directly to the parent-bridge. Therefore, a parent-bridge with a fixed amount of child-links can virtually increase its number of child-links by utilizing this multiple TOQ concept that essentially allows the parent-bridge to mimic the order processing that would take place if each separate grandchild-link had its own dedicated child-link to the parent-bridge. At a minimum, the illustrative system utilizes at least a two-to-one ratio of TOQs per child-link, and not less than a one-to-one ratio of TOQs per associated grandchild-link, and as such, is guaranteed to provide a higher level of transaction throughput than current one-to-one ratio TOQ-to-child-link systems.

Unlike the current systems that do not provide the means for a parent bridge to discern between the source of any communication received through child-link, the illustrative system provides such a means by transmitting an additional identification signal from the child-bridge to the parent-bridge. Thus, a signal can be passed from any child-bridge to its parent-bridge where the signal identifies from which particular grandchild-link a communication originated. Such a signal can be passed whether the parent-bridge is in level 2 and the child-bridge is in level 1, or parent-bridge is in level 3 and child-bridge is in level 2, or the parent-bridge is at any level "n" and child-bridge is at any level n−1.

BRIEF DESCRIPTION OF THE DRAWINGS

A better understanding of the present invention can be obtained when the following detailed description of the disclosed embodiment is considered in conjunction with the following drawings, in which.

DETAILED DESCRIPTION OF PREFERRED EMBODIMENT

The following related patent application are hereby incorporated by reference as if set forth in its entirety:

U.S. patent application Ser. No. 09/749,111, entitled "Relaxed Read Completion Ordering in a System Using a Transaction Order Queue," filed Dec. 26, 2000 and issued as U.S. Pat. No. 6,615,295 on Sep. 2, 2003; and U.S. patent application Ser. No. 09/779,424, entitled "Enhancement to Transaction Order Queue," filed Feb. 8, 2001.

Figure 2:
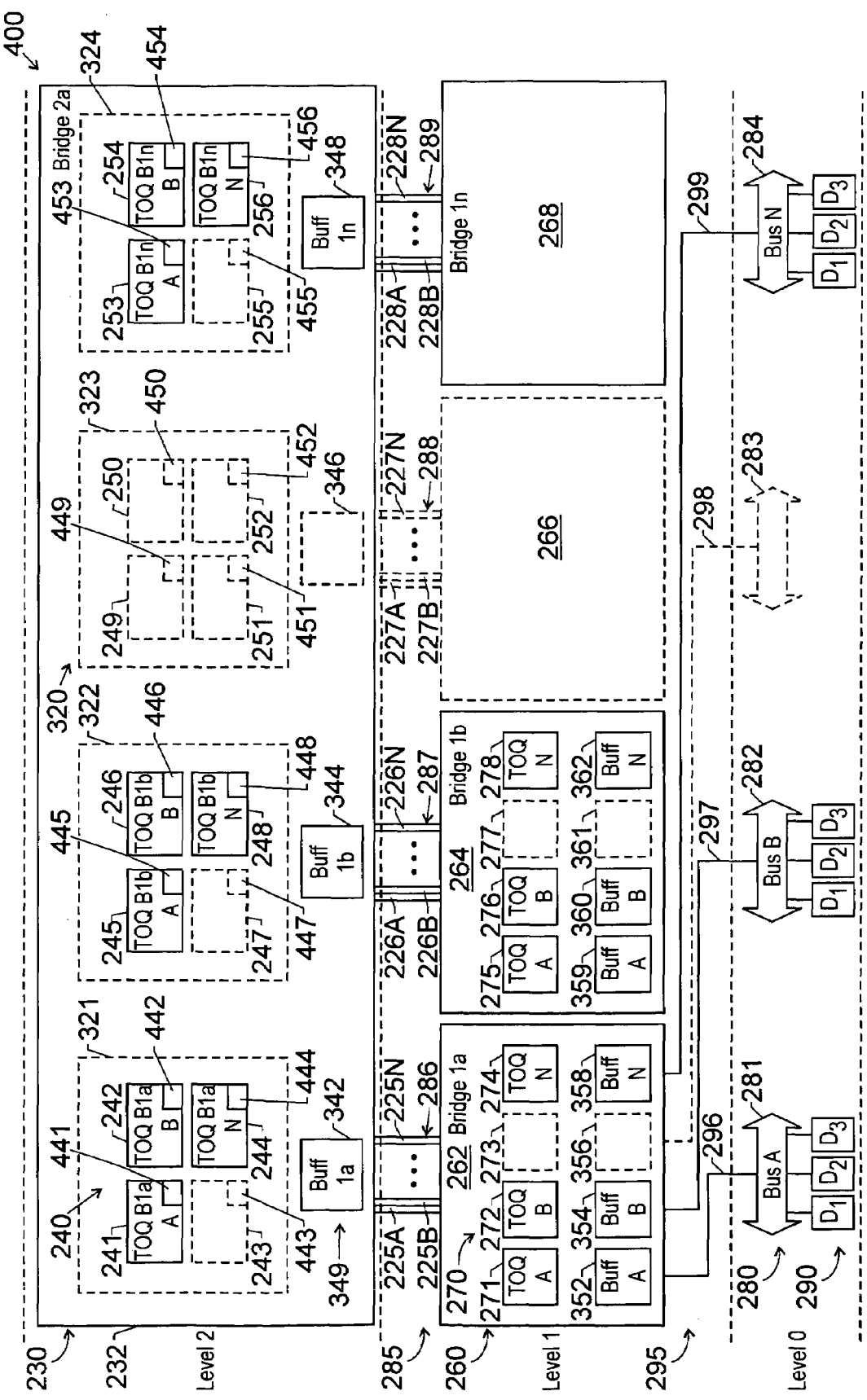
FIG. 2 is a component diagram showing a three level multi-tier bridge/bus/device architecture utilizing multiple TOQs at level 2.

FIG. 2, illustrates a typical multi-bridge architecture 400 implemented according to the disclosed techniques. For purposes of explanation, specific embodiments are set forth to provide a thorough understanding of the present invention. However, it will be understood by one skilled in the art, from reading the disclosure, that the invention may be practiced without these details. Further, although the embodiments are described including three levels of bridges, most, if not all, aspects of the system illustrated apply to systems using two or more levels of bridges. Moreover, well-known elements, devices, process steps, and the like, and including, but not limited to, bridge and transaction order queue design, are not set forth in detail in order to avoid obscuring the disclosed system. As used herein, the "child-link" generally refers to the connection between the parent-bridge and child-bridge, including the link interface of the parent-bridge or the link interface of the child-bridge. Also, the term "grandchild-link" generally refers to the connection between the child-bridge and the grandchild component, including the link interface of the child-bridge or the link interface of the grandchild component. In FIG. 2, the multi-tier bridge architecture 400 in the illustrated embodiment is made up of 3 levels: 0, 1 and 2.

Level 0 represents a common architecture present in modem computer systems, (see FIG. 1 and buses 122 and 124 and devices 112), where multiple buses 280 are coupled with multiple I/O devices 290. Next, level 1, also a common architecture present in modem computer systems, (see FIG. 1 bus-bridge 139), contains multiple bus-bridges 260 connected via grandchild-links 295 to multiple buses 280 where each such grandchild-link 295 has its own TOQs 270 for ordering the transactions for each individual bus 280. Also, each child-bridge 260 has one transaction buffer, i.e. 352, for each grandchild link, i.e., 296. Level 1's architecture, which provides a TOQ 270 for each connected bus 280, allows transaction ordering to occur in its most efficient form, i.e., one TOQ per one bus.

Finally, in FIG. 2, level 2 represents a disclosed embodiment which utilizes a bridge-bridge 232 with child-links 285 to the multiple bus-bridges 260 in level 1. Here, each child-link 285 to bus-bridges 260, has its own set of TOQs 320 and its own transaction buffer 349. The number of TOQs 240 in any such set 320 is equal to the number of buses 280 attached via grand-child links 295 to the bus-bridge 260. In operation, when a new transaction is received by a transaction buffer, i.e., 349, the buffer contacts the appropriate TOQ 320, based on the grand-child link 295 the transaction originated. This one-to-one ratio of TOQs-to-buses at a bridge-bridge level (level 2), unlike simply a one-to-one ratio of TOQs-to-bus-bridge, allows pure transaction ordering, (i.e., one TOQ per bus), to occur in a bridge located at least one level deeper than the architecture shown in FIG. 1. As such, FIG. 2's level 2 design represents a more efficient design than that shown in FIG. 1's level 2 design. Specifically, the potential blocking of any particular bus's transactions by another bus, as discussed above in relation to FIG. 1, is no longer present with the design disclosed in FIG. 2, i.e., where the disclosed multiple-TOQ concept is present.

In further detail, level 2's TOQs are broken into as many sets 320 as there are child-links 285. Four child-links 286, 287, 288 and 289 in parent-bridge 232 are shown, and each link has an associated TOQ set 320: 321, 322, 323 and 324 respectively, as well as their own transaction buffers 349. Each of these respective child-links 286, 287, 288 and 289 includes multiple channels, such as channels 225A–225N, 226A–226N, 227A–227N, and 228A–228N. Further, within each TOQ set 320 are as many TOQs as there are grand-child links 295 for the associated child-link 285. For example, TOQ set 321, associated with child-link 286, and where such child-link 286 has four grand child links associated thereto:

296, 297, 298 and 299, is made up of four TOQs: 241, 242, 243 and 244. It should be noted that TOQ 243 is drawn in phantom form to show that it could represent multiple TOQs to assure that there were an equal amount of TOQs in set 321 as grand-child links associated with child-link 286. Each of the TOQ sets 320 contains a phantom TOQ for the same purpose. The remaining TOQ sets disclosed are as follows: TOQ set 322 contains TOQs 245, 246, 247 and 248; TOQ set 323, representing none or more TOQ sets 320, contains TOQs 249, 250, 251 and 252; and TOQ set 324 contains TOQs 253, 254, 255 and 256. Each of these TOQs 241–256 may include a TOQ identifier, such as TOQ identifiers 441–456, which are discussed below in greater detail. Other embodiments may use less than one TOQ per grand-child link 295 for the associated child-link 285, but a minimum of two such TOQs are needed to optimize transaction ordering. Further, other multi-TOQ architectures may use more or less number of links to more or less number of child bridges.

As discussed above, each of the TOQs 240 in parent-bridge 232 correspond with a grandchild-link 295. As such, each TOQ 240 is matched with a grandchild-link 295. A matching can be achieved in variety of ways. A matching can occur where the child-bridge transmits or originates a transaction identifier that is a predefined address of an associated TOQ 240. For example, in the case of TOQ set 321 having four TOQs 241, 242, 243 and 244, TOQ could have corresponding addresses 00, 01, 10 and 11. Thus, at the same time that child-bridge 260 is transmitting a transaction over child-link 286, the child-link 286 could transmit address 01 on a transaction identifier communication link, (two unused channels, such as channels 225A and 225B, on child-link 286 for example), such that parent-bridge 232 routes the transmission to TOQ 242. It is also contemplated that rather than identifying a TOQ by an address, it may be identified with a stored key or transaction order queue identifier, such as the keys or TOQ identifiers 441–456. Here, using the same transaction identifier 01, if each TOQ 240 had associated with it a key, the parent-bridge 232 could compare an incoming transaction identifier with each of the keys of each TOQ, and where there was a match, the parent-bridge would route the corresponding transmission to that TOQ, in this example again, TOQ 242. It is also contemplated that where a transaction is transmitted with a transaction identifier that does not match a key in any one of the TOQs 240, that the parent-bridge would route the transaction to a default TOQ, for example, TOQ 241. This assures that all transactions are handled.

In theory, the number of TOQs one could place within bridge-bridge 232 is limitless. However, in reality the number of TOQs employed in bridge-bridge 232 is limited by chip hardware constrains, such as size and complexity, and/or the ability and efficiency of uniquely identifying a transaction from a particular bus. In the disclosed embodiment, it is contemplated that a transaction is identified through a simultaneous transmission of an identifier from associated bus-bridge 260 to bridge-bridge 232 through an unused channel, such as one of the channels 225A–225N, on the child-links 285. In the case of a bus-bridge 260 having two buses attached via grandchild-links 295, bus 281 and bus 282, for example, a single channel could be used to transmit an identifier of either a "0", or a "1", to indicate which bus was the source of the transaction. However, where more than two buses 280 are attached to the bus-bridge 260, and a constraint exists which requires the use of only one channel, or for which only two TOQs are available, it is contemplated that the same single channel could still be used to handle the transactions by assigning buses 280, or grand-child links 295, an identifier of either "1", or "0," where the separate TOQs would handle buses of common identities as though they originated from a single source. As the number of buses rises, or the number of available TOQs increase, the need for additional channels arise. For example, where 4 buses and 4 TOQs are present, two channels (i.e., base 10's "3"=base 2's "11") would be needed, if however 8 buses and 8 TOQs are present, three channels (i.e., base 10's "7"=base 2's "111") would be needed. It should be noted that other means of identifying a transaction may occur through signals sent through dedicated connections between the bus-bridge 260 and the bridge-bridge 232, or means other than an unused channel in child-links 285.

Figure 1:
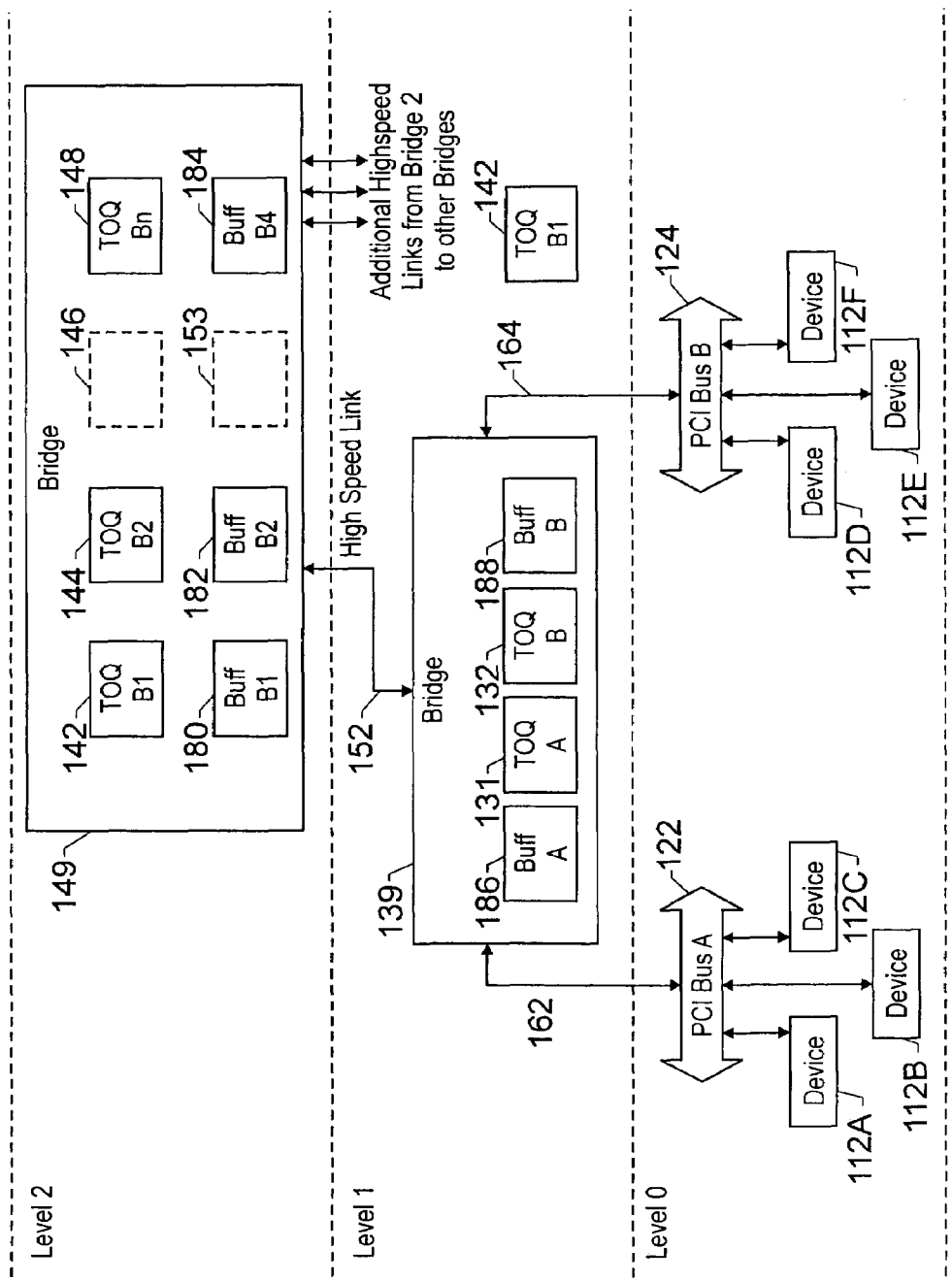
FIG. 1 is a component diagram showing a typical three level multi-tier bridge/bus/device architecture.

It is contemplated that if the disclosed embodiment is implemented with a typical parent-bridge 140 as found in FIG. 1, i.e., a parent-bridge with only one TOQ per child-links 285, rather than a parent-bridge 232 which has multiple TOQs per child-links 285, that this implementation would result in a system with the same throughput as the typical architecture shown in FIG. 1. This is because although a bus identification signal would be sent to the parent-bridge 232, there would be no functionality to receive it, nor any additional TOQs to take advantage of the information if it could be received, and thus, the parent-bridge 232 would simply order all the transactions coming through a particular child-link 285 as though they were originating from the same bus 280, or grand-child link 295, i.e., the same result as what is occurring at parent-bridge 140 in FIG. 1. Further, it is also contemplated that if the disclosed embodiment, having at least one parent-bridge 232 that in turn has multiple TOQs 240 per its child-links 286, is implemented without a child-bridge 260 that either originates or transmits bus identification signals to the parent-bridges 232, i.e, the child-bridge 162 of FIG. 1, that this implementation would also function with the same throughput as the architecture of FIG. 1. This is because the parent-bridge 232 would receive each transaction without any bus identification signal and for parent-bridge 232 to receive a transaction without an identification signal is the same as if it received a transaction with an address of "0." Thus, all the transactions received by parent-bridge 232 would be directed to a single TOQ resulting in the same throughput experienced by the system of FIG. 1.

Figure 3A:
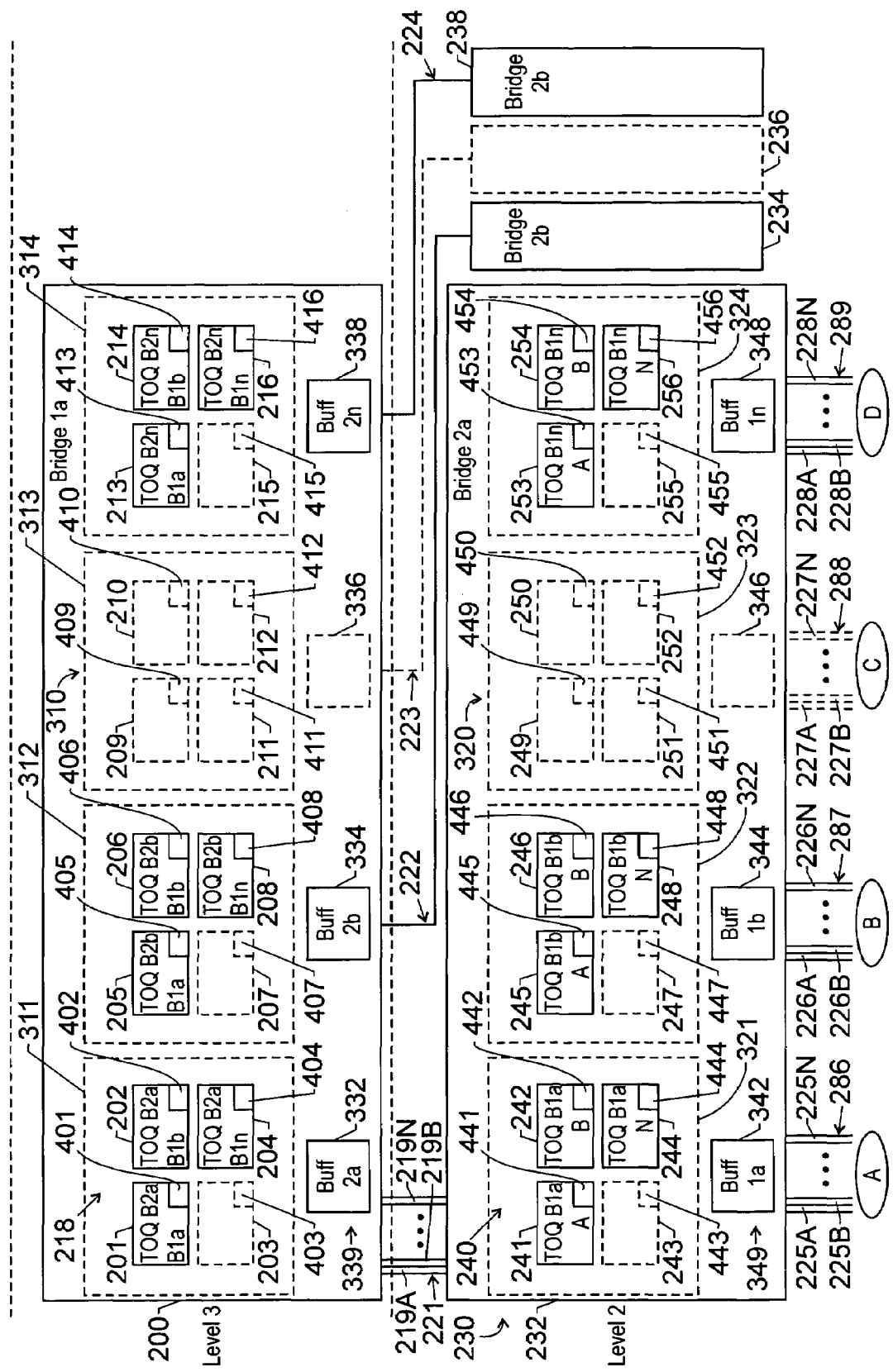
FIGS. 3A and 3B is a component diagram showing a four level multi-tier bridge/bus/device architecture utilizing multiple TOQs at multiple levels.
Figure 3B:
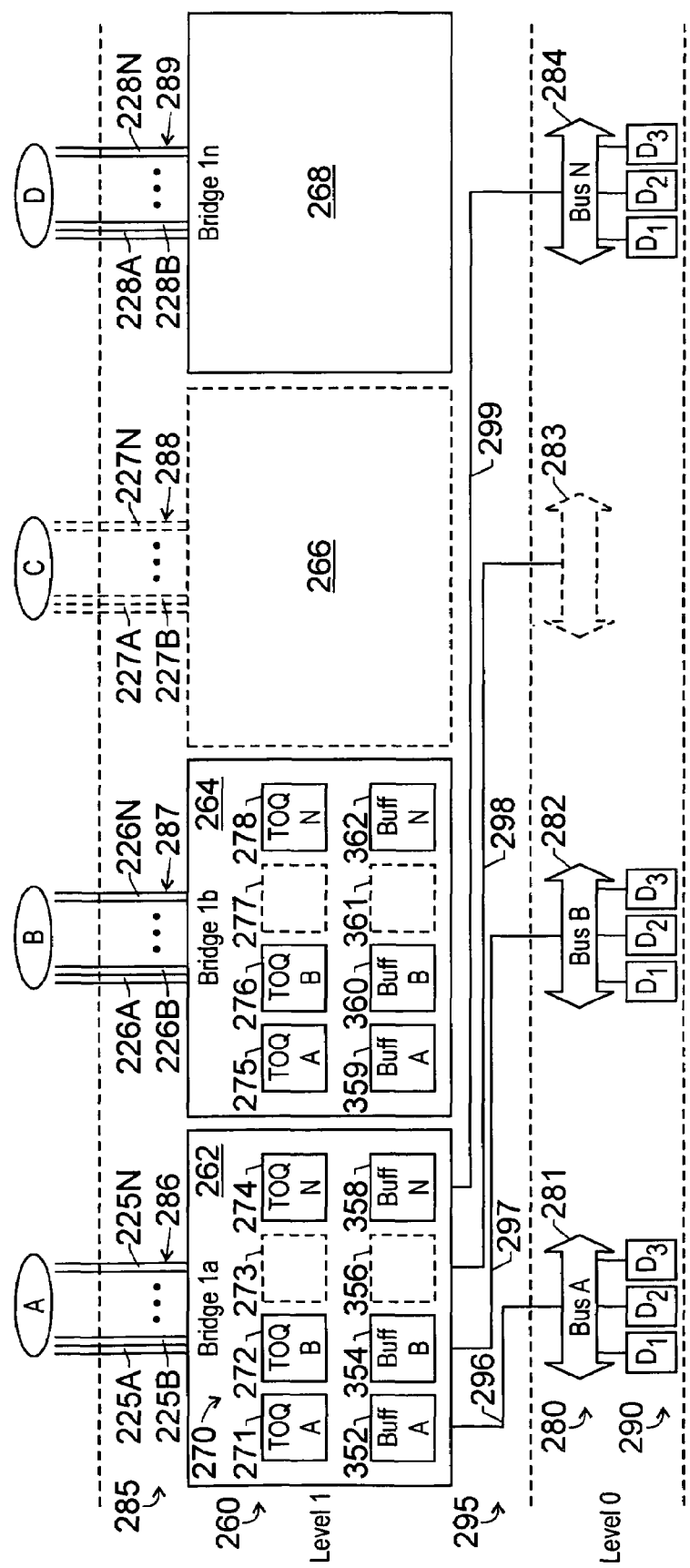

FIGS. 3A and 3B is a disclosed embodiment that introduces the application of the disclosed techniques to architectures using three or more hierarchical levels of bridges. In the embodiment shown in FIGS. 3A and 3B, the same type of architecture and functionality that was attributed to the bridge-bridge 232 in level 2 in FIG. 2 (the parent-bridge in FIG. 2), is now in bridge-bridge 200 (parent-bridge) in level 3, but rather than ordering transactions received directly from a bus-bridge 260 in level 1, (the child-bridge in FIG. 2), the parent-bridge 200 receives transactions from a child-bridge 232 in level 2. Here, rather than TOQ sets 310 containing TOQs 218 that maintain ordering for buses 280, such TOQs 218 maintain ordering for bus-bridges 260 (grandchild-bridges). However, for embodiments that do not use the multi-TOQ design, the parent-bridge 200 in level 3, as shown in FIGS. 3A and 3B, receives multiple transactions over child-links 220 from the corresponding child-bridge 232, but does not know from which grandchild-bridge 260 the transaction originated, and therefore must apply standard transaction ordering across all transactions coming across child-links 220, thus, unnecessarily allowing the blocking of transactions originating from one grandchild-bridge 260 by transactions originating from another grandchild-bridge 260. Regardless of the number of levels of hierarchical bridge architecture employed, the implementation of the multi-TOQ per grandchild-link design across any parent/child/grandchild combinations would result in improved throughput through such parent. Thus, architectures with three or more levels all have at least one parent/child/grandchild combination that can have their throughput optimized by including the suggested multi-TOQ architecture.

In further detail, level 3, in FIG. 3A, represents a disclosed embodiment which utilizes a bridge-bridge 200 with connections 220 (child-links) to the multiple bridge-bridges 230 disclosed in level 2. Here, every child-link 220 to bridge-bridges 260 has its own set of TOQs 310 and transaction buffers 339. The number of TOQs 218 in any such set 310 is equal to the number of bus-bridges 260 attached via grand-child links 285 to the bridge-bridge 230. This one-to-one ratio of TOQs-to-bus-bridges at a bridge-bridge level (level 3), allows separate transaction ordering to occur for the groups of transactions originating from any one bus-bridge, (i.e., one TOQ per bus-bridge), and to occur in a bridge located at least one level deeper than the architecture shown in FIG. 2. As such, FIG. 3's level 3 design represents a more efficient design than that shown in FIG. 2's level 2 design. Specifically, the potential blocking of any particular bus-bridge's transactions by another bus-bridge is no longer present with the design in FIGS. 3A and 3B, i.e., where the disclosed multiple-TOQ concept is introduced at a third level of bridges.

In even greater detail, level 3's TOQs are broken into as many sets 310 as there are child-links to bridge-bridge 200. Specifically, four child-links 221, 222, 223 and 224 are shown in parent-bridge 200, and each link has an associated TOQ set 310: 311, 312, 313 and 314 respectively, as well as their own transaction buffers 339. The child link 221 may include channels 219A–219N, which may be any number of channels that are utilized to communicate with the parent-bridge 232. It should also be appreciated that each of the other child-links may include various channels, as well. Further, within each TOQ set 310 there are as many TOQs 218 as there are grand-child links 285 for the associated child-link 220. For example, TOQ set 311, associated with child-link 221, and where such child-link 221 has four grand child links associated thereto: 286, 287, 288 and 289, is made up of four TOQs: 201, 202, 203 and 204. It should be noted that TOQ 203 is drawn in phantom form to show that it could represent multiple TOQs to assure that there were an equal amount of TOQs in set 311 as grand-child links associated with child-link 221. Each of the TOQ sets 310 contain a phantom TOQ for the same purpose. The remaining TOQ sets disclosed are as follows: TOQ set 312 contains TOQs 205, 206, 207 and 208; TOQ set 313 representing none or more TOQ sets 310, contains TOQs 209, 210, 211 and 212; and TOQ set 314 contains TOQs 213, 214, 215 and 216. Each of these TOQs 201–216 may include a TOQ identifier, such as TOQ identifiers 401–416, which are similar to the TOQ identifiers 441–456 discussed above. Other embodiments may use less than one TOQ per grandchild link 285 for the associated child-link 220, but a minimum of two such TOQs are needed to optimize transaction ordering. Further, other multi-TOQ architectures use more or less number of links to more or less number of child-bridges or grandchild-links.

Other embodiments may incorporate the disclosed multiple TOQ concept, but may do so in a fashion such that there is not a one-to-one correlation between the TOQs in the parent level bridge-bridge to the number of grand-child links. However, such embodiments would use at least two TOQs per child-link in any TOQ set. For example, looking at FIG. 2 where the parent level is 232, here if the TOQ set 321 were changed to have only two TOQs 241 and 242, and child-link 285 remained connected to bus-bridge 262 that continued to have the four grand-child links 296, 297, 298 and 299 to the four buses 281, 282, 283 and 284, then each TOQ 241 and 242, for example, could each handle the transactions from two of the buses. In such a design, although there are two buses for each TOQ, i.e., TOQ 241 for buses 281/282 and TOQ 242 for buses 283/284, and therefore the transactions from both buses are subject to the blocking of transactions from the other, this design still represents an improvement to a design where no multiple TOQs are used, as each bus, or grandchild-link, can only have its transaction blocked by one other bus (i.e., the other bus sharing the same TOQ), not three (i.e., not the three other grand-child links).

Additionally, rather than a single transaction buffer being used per child-link in a parent bridge, other embodiments may utilize a one-to-one ratio of transaction buffers to TOQs. For example, in FIG. 2, instead of there being one transaction buffer 342 per TOQ set 321, there would instead be four transaction buffers, (i.e., Buff 1a, Buff 2b, Buff 2c and Buff 2d), for each TOQ 241, 242, 243 and 244. As such, there are as many transaction buffers 349 as TOQs 240 (this multi-transaction buffer to multi-TOQ is not shown in any figure), and as many TOQs as there are grand-child links. When a transaction is received by the parent-bridge 232, the parent-bridge 232 places the transaction in the proper transaction buffers 342 (multiple buffers not shown), i.e. the transaction buffer 342 that corresponds with the grandchild-link 295 from which the transaction originated. It is contemplated that such an embodiment having a one-to-one ratio of transaction buffers to TOQs, might be easier to implement. However, it is also contemplated that such an embodiment would be more expensive from the standpoint of silicon used.

Figure 4:
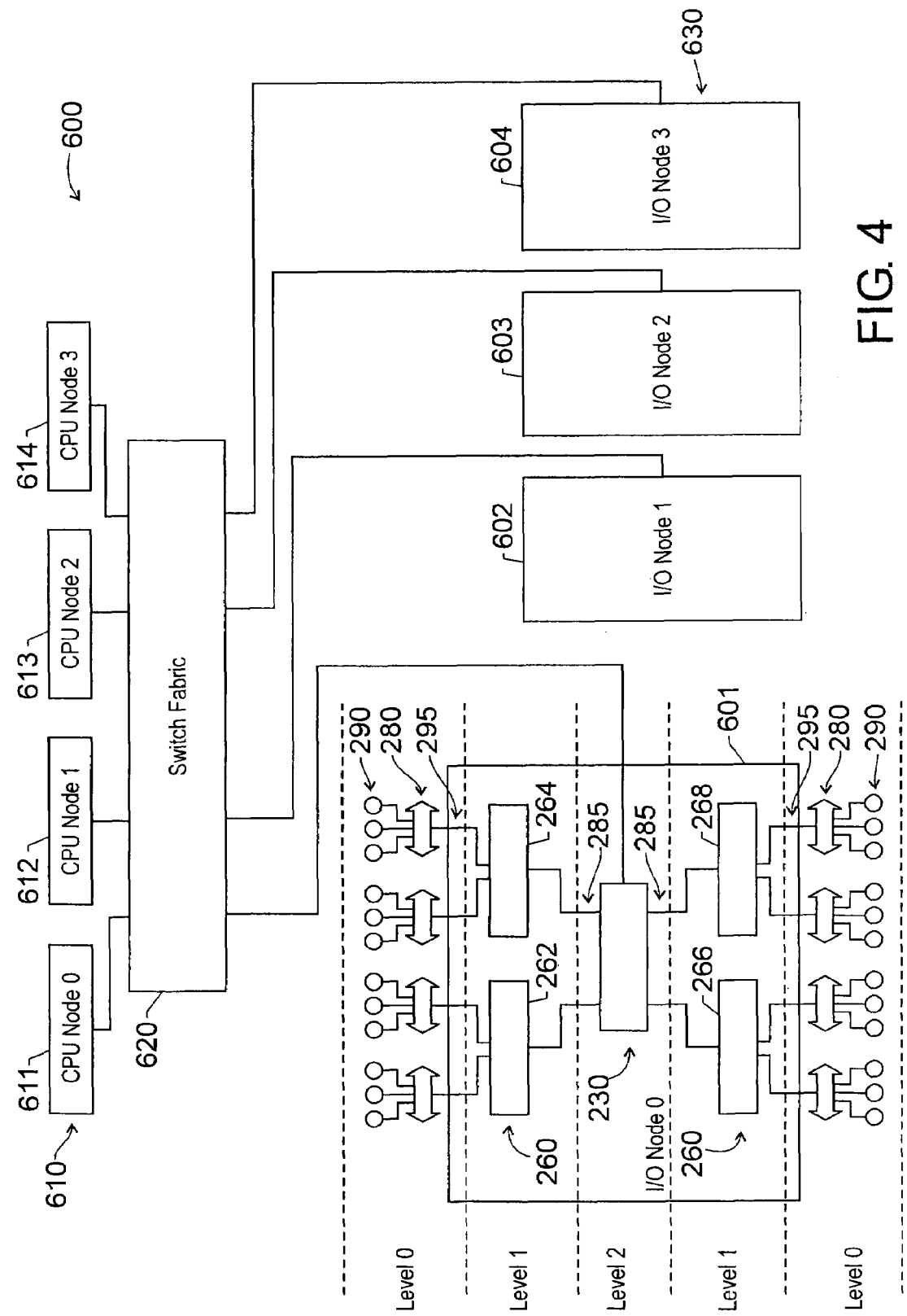
FIG. 4 is a block diagram showing the larger system for which an implementation like that of FIG. 2 can be used.

FIG. 4 shows the disclosed embodiment of FIG. 2 incorporated into a computer system 600. The computer system 600 includes CPU nodes 610, I/O nodes 630, and switch matrix 620. CPU nodes 610 include the four nodes 611, 612, 613 and 614. I/O nodes 630 include four I/O nodes 601, 602, 603 and 604. A switch fabric 620 is connected to CPU nodes 610 and to I/O nodes 630. The embodiment disclose in FIG. 2 is shown in FIG. 4 as I/O node 0. Like FIG. 2, I/O node 0 contains a parent-bridge 230. Parent-bridge 230 is attached via child-links 285 to child-bridges 260. The child-bridges 260, in turn, are connected via grand-child links 295 to buses 280. Finally, buses 280 are attached to I/O devices 290. It is contemplated, although not required, that some or all of the other I/O nodes would adopt a similar architecture shown in detail in I/O node 0.

The foregoing disclosure and description of the various embodiments are illustrative and explanatory thereof, and various changes in the nodes, buses, signals, components, circuit elements, circuit configurations, and signal connections, as well as in the details of the illustrated circuitry and construction and method of operation may be made without departing from the spirit and scope of the invention.

We claim:
1. A parent-bridge comprising:
   a plurality of child-links for receiving a plurality of transactions from a plurality of child-bridges, the child-bridges having a plurality of child-level transaction order queues and a plurality of grandchild-links for receiving the plurality of transactions from a plurality of buses;

a plurality of transaction identifier communication links for receiving a plurality of transaction identifiers for identifying the plurality of transactions, wherein each of the plurality of transactions is associated with a respective grandchild-link of a child-bridge; and a plurality of transaction order queue sets, the plurality of transaction order queue sets including a transaction order queue set for each respective child-link, each of the transaction order queue sets having a plurality of parent-level transaction order queues configured to receive a subset of the plurality of transactions, the subset including those transactions communicated over a particular child-link, wherein each of the plurality of transaction identifiers uniquely associates a transaction of the subset with only one of the plurality of parent-level transaction order queues and one of the grandchild-links, and wherein the parent-bridge is configured to route the transaction of the subset to the associated parent-level transaction order queue based on the transaction identifier associated with the transaction, such that the plurality of parent-level transaction order queues and the plurality of transaction identifiers facilitate maintenance of transaction ordering from the plurality of child-bridges to and within the parent-bridge.

2. The parent-bridge of claim 1, wherein the plurality of transaction identifier communication links comprise the plurality of child-links.

3. The parent-bridge of claim 2, each of the plurality of child-links further comprising:
a plurality of channels;
wherein at least one channel of the plurality of channels is used to receive the plurality of transaction identifiers.

4. The parent-bridge of claim 1, further comprising a plurality of transaction buffers associated with the plurality of child-links.

5. The parent-bridge of claim 4, wherein the plurality of transaction buffers includes multiple transaction buffers associated with each of the plurality of child-links.

6. The parent-bridge of claim 1, wherein the plurality of parent-level transaction order queues and the plurality of transaction identifiers facilitate pure transaction ordering at the parent-bridge level.

7. The parent-bridge of claim 1, further comprising:
a routing mechanism for routing a transaction with a transaction identifier to a matching parent-level transaction order queue.

8. The parent-bridge of claim 7, wherein each transaction order queue of the plurality of parent-level transaction order queues is associated with a transaction order queue identifier uniquely matching a transaction identifier of the plurality of transaction identifiers.

9. The parent-bridge of claim 7, wherein the routing mechanism routes a transaction with a transaction identifier without a matching transaction order queue to a default transaction order queue.

10. The parent-bridge of claim 1, wherein each of the plurality of child-links is connected to a bus-bridge.

11. The parent-bridge of claim 1, wherein each of the plurality of child-links is connected to a bridge-bridge.

12. The parent-bridge of claim 1, wherein each of the plurality of transaction identifiers is uniquely associated with only one of the grandchild-links.

13. A child-bridge, comprising:
a plurality of grandchild-links for receiving a plurality of transactions from a first level of a computer hierarchy, the child-bridge configured to be located at a second level of the computer hierarchy;

a first plurality of transaction order queues for facilitating transaction ordering at the second level;

a child-link for sending the plurality of transactions received by the plurality of grandchild-links to a parent-bridge located at a third level of the computer hierarchy; and a transaction identifier communication link for sending a plurality of transaction identifiers associated with the plurality of transactions sent on the child-link, wherein each of the plurality of transaction identifiers is originated within the child-bridge and is uniquely associated with only one the plurality of grandchild-links and only one of a second plurality of transaction order queues of the parent-bridge that receive the plurality of transactions from the child-link and are configured to facilitate transaction ordering at the third level, wherein the plurality of transaction identifiers enable transaction ordering to be maintained from the second level through the third level.

14. The child-bridge of claim 13, wherein the transaction identifier communication link comprises the child-link.

15. The child-bridge of claim 14, the child-link further comprising:
a plurality of channels;
wherein at least one channel is used to send the plurality of transaction identifiers.

16. The child-bridge of claim 13, wherein the plurality of transaction identifiers enable pure transaction ordering to be maintained through the third level.

17. The child-bridge of claim 13, wherein at least two of the plurality of grandchild-links are associated with at least two different transaction identifiers of the plurality of transaction identifiers.

18. The child-bridge of claim 13, wherein a grandchild-link of the plurality of grandchild-links is connected to a bus.

19. The child-bridge of claim 13, wherein a grandchild-link of the plurality of grandchild-links is connected to a bus-bridge.

20. The child-bridge of claim 13, wherein a grandchild-link of the plurality of grandchild-links is connected to a bridge-bridge.

21. A method of routing transactions with transaction identifiers, the transactions received by a parent-bridge, the parent-bridge comprising a child-link and a plurality of transaction order queues for the child-link, comprising the steps of:
receiving a transaction on the child-link, the child-link coupled to a child-bridge, wherein the transaction is associated with a respective grandchild-link of the child-bridge and is ordered at the child-bridge level with respect to other transactions received by the child-bridge;

receiving a transaction identifier for the transaction, wherein the transaction identifier is indicative of the association of the transaction and the respective grandchild-link;

matching the transaction identifier to a transaction order queue of the plurality of transaction order queues for the child-link, wherein the transaction identifier is uniquely associated with only one of the plurality of transaction order queues such that the respective grandchild-link is uniquely associated with the one of the plurality of transaction order queues via the transaction identifier; and routing the transaction to the transaction order queue associated with the transaction identifier, wherein routing enables transaction ordering performed at the child-bridge level to be maintained at the parent-bridge level.

22. The method of claim 21, wherein the parent-bridge further comprises a transaction buffer for the child-link, further comprising the step of storing the transaction in the transaction buffer.

23. The method of claim 21, wherein the parent-bridge further comprises a plurality of transaction buffers for the child-link, further comprising the steps of:
matching the transaction identifier to a transaction buffer of the plurality of transaction buffers for the child link;
routing the transaction to the transaction buffer;
storing the transaction in the transaction buffer.

24. The method of claim 21, wherein the transaction identifier is received on the child-link.

25. A method of routing transactions, the transactions received by a child-bridge on a plurality of grandchild-links, the child-bridge connected to a parent-bridge, comprising the steps of:
receiving a transaction on a grandchild-link;
originating a transaction identifier, wherein the transaction identifier uniquely associates the grandchild-link with a single transaction order queue of the parent-bridge such that a one-to-one correspondence between the grandchild-link and the single transaction order queue is established;
sending the transaction to the parent-bridge; and
sending the transaction identifier to the parent-bridge;
wherein the one-to-one correspondence between the grandchild-link and the single transaction order queue enables pure transaction ordering in the parent-bridge.

26. The method of claim 25, wherein the transaction identifier is sent to the parent-bridge on a child-link.

27. The method of claim 25, wherein the transaction identifier is determined by the grandchild-link on which the transaction was received.

28. A computer system, comprising:
a plurality of processors;
a parent-bridge at a first level of the computer system, the parent-bridge comprising:
a child-link; and
a plurality of transaction order queues connected to the child-link; and
a child-bridge located at a second level of the computer system and connected via the child-link to the parent bridge, the child-bridge comprising a plurality of grandchild-links configured for connection to a plurality of devices at a third level of the computer system;
wherein each of the plurality of grandchild-links is associated with only one of the plurality of transaction order queues to provide a one-to-one correspondence between each of the plurality of grandchild-links and a respective transaction order queue to enable pure transaction ordering at the first level of transactions originating from the third level.

29. The computer system of claim 28, further comprising:
a plurality of child-links to a plurality of child-bridges.

30. The computer system of claim 28, wherein the child-bridge transmits a transaction and transaction identifier to the parent bridge.

31. The computer system of claim 30, wherein the transaction identifier is associated with a transaction order queue of the plurality of transaction order queues in the parent-bridge.

32. The method of claim 31, wherein the transaction identifier exclusively identifies a grandchild-link of the plurality of grandchild-links.

33. The computer system of claim 31, wherein the parent-bridge routes the transaction to the transaction order queue of the plurality of transaction order queues matching the transaction identifier.

34. The computer system of claim 28, further comprising a transaction buffer connected to the child-link.

35. The computer system of claim 28, further comprising a plurality of transaction buffers connected to the child-link.

36. A computer system, comprising:
a plurality of buses at a first level of the computer system;
a plurality of child-bridges at a second level of the computer system, wherein each of the plurality of child-bridges is coupled to at least a respective one of the plurality of buses and is configured to receive transactions therefrom;
a parent-bridge at a third level of the computer system, the parent-bridge coupled to each of the plurality of child-bridges, wherein the parent-bridge comprises a plurality of transaction order queue sets, wherein the plurality of transaction order queue sets includes one transaction order queue set associated with each respective child-bridge of the plurality of child-bridges, and wherein each of the plurality of transaction order queue sets associated with the plurality of child-bridges comprises a plurality of transaction order queues, each of the buses of the plurality of buses being associated with only one of the transaction order queues such that there is a one-to-one correspondence between the buses of the first level and the transaction order queues of the third level, and such that an association between each of the plurality of buses and a transaction received therefrom is maintained at both the second level and the third level of the computer system to facilitate pure transaction ordering within the third level.

* * * * *

UNITED STATES PATENT AND TRADEMARK OFFICE
CERTIFICATE OF CORRECTION

PATENT NO. : 7,111,105 B2  
APPLICATION NO. : 10/038844  
DATED : September 19, 2006  
INVENTOR(S) : Paras Shah et al.

Page 1 of 1

It is certified that error appears in the above-identified patent and that said Letters Patent is hereby corrected as shown below:

In column 1, line 20, delete "multiple I/O devices" and insert -- multiple buses. In doing so, these bus-bridges receive communications to and from each of the multiple I/O devices --, therefor.

In column 9, line 62, in Claim 12, delete "grandchild-links." and insert -- grandchild-links to enable pure transaction ordering within the parent-level. --, therefor.

In column 10, line 12, in Claim 13, delete "one the plurality" and insert -- one of the plurality --, therefor.

Signed and Sealed this  
Twenty-second Day of November, 2011

David J. Kappos  
*Director of the United States Patent and Trademark Office*